US008691179B2

(12) United States Patent
Kim et al.

(10) Patent No.: US 8,691,179 B2
(45) Date of Patent: Apr. 8, 2014

(54) METHOD FOR FABRICATING GRAPHENE SHEETS OR GRAPHENE PARTICLES USING SUPERCRITICAL FLUID

(75) Inventors: Jaehoon Kim, Seoul (KR); Jong Min Park, Seoul (KR); Byoung Koun Min, Seoul (KR); Jeong Myeong Ha, Seoul (KR); Nugroho Agung, Seoul (KR); Nursanto Eduardus, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 201 days.

(21) Appl. No.: 13/238,098

(22) Filed: Sep. 21, 2011

(65) Prior Publication Data

US 2012/0171108 A1   Jul. 5, 2012

(30) Foreign Application Priority Data

Jan. 4, 2011   (KR) .................. 10-2011-0000611
Apr. 14, 2011  (KR) .................. 10-2011-0034741

(51) Int. Cl.
*C01B 31/04*   (2006.01)
*B82Y 40/00*   (2011.01)

(52) U.S. Cl.
USPC ......................................... 423/448; 977/896

(58) Field of Classification Search
USPC ............ 423/445 R, 448; 252/378 R; 977/896
See application file for complete search history.

(56) References Cited

U.S. PATENT DOCUMENTS

2011/0052813 A1* 3/2011 Ho et al. .................. 427/256

OTHER PUBLICATIONS

Nursanto, et al., Facile synthesis of reduced graphene oxide in supercritical alcohols and its lithium storage capacity, Green Chem. 2011; 13: 2714-2718 (published online Aug. 11, 2011).*
Zhou, et al., Hydrothermal Dehydration for the "Green" Reduction of Exfoliated Graphene Oxide to Graphene and Demonstration of Tunable Optical Limiting Properties, Chem. Mater. 2009; 21: 2950-2956.*
Sungjin Park, et al; "Chemical methods for the production of graphenes", Nature Nanotechnology Review Article, Published Online: Mar. 29, 2009, DOI: 10.1038/NNANO.2009.58, pp. 217-224.
A.K.Geim, "Graphene: Status and Prospects", Science, vol. 324, Jun. 19, 2009; www.sciencemag.org; pp. 1530-1534.
Matthew J. Allen, et al; "Honeycomb Carbon: A Review of Graphene", Chem. Rev. 2010, vol. 110, Issue 1, pp. 132-145 Publication Date (Web) Jul. 17, 2009.
Sasha Stankovich, et al; "Graphene-based composite materials", Nature Letters, vol. 442, Jul. 20, 2006, doi:10:1038/nature04969, pp. 282-286.
Meryl D. Stoller, et al; "Graphene-Based ultracapacitors", Nano Letters, vol. 8, No. 10, pp. 3498-3502, Published on the Web Sep. 13, 2008.

(Continued)

*Primary Examiner* — Daniel C McCracken
(74) *Attorney, Agent, or Firm* — Ladas & Parry LLP

(57) ABSTRACT

A method for fabricating graphene sheets or graphene particles includes (a) dispersing graphene oxide in an alcohol solution to prepare a graphene oxide dispersion solution, (b)reducing the graphene oxide dispersion solution under a supercritical condition to prepare graphene sheets or graphene particles, each of which is as a cluster of the graphene sheets, and (c) separating the graphene sheets or graphene particles, followed by washing and drying, and a method for fabricating a graphene film is configured to fabricate a graphene film in form of a thin film using the graphene sheets or graphene particles fabricated according to the method.

20 Claims, 6 Drawing Sheets

(56) References Cited

OTHER PUBLICATIONS

Dmitriy A. Dikin, et al; "Preparation and characterization of graphene oxide paper", www.nature.com/nature;_Supplementary_Information; pp. 108, Jul. 26, 2007; doi:10.1038/nature06016.

Dmitriy A. Dikin, et al; "Preparation and Characterization of graphene oxide paper", Nature Letters, vol. 448, Jul. 26, 2007, pp. 457-460.

T. Ramanathan, et al; "Functionalized graphene sheets for polymer nanocomposites", Nature Nanotechnology, vol. 3, pp. 327-331, Published online May 11, 2008; doi:10.1038/nnano.2008.96.

Peter Black, et al; "Graphene-Based Liquid Crystal Device", Nano Letters, 2008 vol. 8, No. 6, pp. 1074-1708; Published on the Web Apr. 30, 2008.

J. Scott Bunch, et al; "Electromechanical Resonators from Graphene Sheets", Jan. 26, 2007, vol. 315, pp. 490-493.

J. Scott Bunch, et al; "Supporting Online Material for Electromechanical Resonators from Graphene Sheets", www.sciencemag.org/cgi/content/full/315/5811/490/DCI; Published Jan. 26, 2007, 8 pages.

Dan Li, et al; "Graphene-Based Materials", Materials Science, Science, www.sciencemag.org, May 30, 2008; vol. 320, pp. 1170-1171.

Vincent C. Tung, et al; "High-Throughput Solution Processing of Large-Scale Graphene", Manuscript: NNANO-08030260B; Nature Nanotechnology, vol. 4, pp. 25-29, Published online: Nov. 9, 2008; doi:10.1038/nnano.2008.329.

Vincent C. Tung, et al; *Supporting Information "High-Throughput Solution Processing of Large Scale Graphene" Manuscript: NNANO-08030260B 9 pages* Published online: Nov. 9, 2008.

Jay R. Lomeda, et al; "Diazonium Functionalization of Surfactant-Wrapped Chemically Converted Graphene Sheets", Journal American Chemical Society, Published on Web Nov. 8, 2008, vol. 130, pp. 16201-16206.

Jay R. Lomeda, et al; *Diazonium Functionalization of Surfactant Wrapped Chemically Converted Graphene Sheets—Supporting Information*; Journal American Chemical Society, Published on Web Nov. 8, 2008, vol. 130, pp. S-1 to S-3.

Sasha Stankovich, et al; "Graphene-based composite materials", Nature Letters, vol. 442, Jul. 20, 2006; doi:10.1038/nature04969; pp. 282-286.

Guoxiu Wang, et al; "Facile Synthesis and Characterization of Graphene Nanosheets", J. Phys. Chem. C; 2008, vol. 112, pp. 8192-8195; Publication Date (WEB): May 1, 2008.

Yongchao Si, et al; *Supporting Information to Accompany: "Synthesis of Water Soluble Graphene", 3 pages, of Supporting Information* Nano Letters, vol. 8, No. 6, Feb. 28, 2008.

Yongchao Si, et al; Synthesis of Water Soluble Graphene, Nano Letters, vol. 8, No. 6, Feb. 28, 2008 pp. 1679-1682.

Von Ulrich Hofmann, et al; "Die Reduktion von Graphitoxyd mit Schwefelwasserstoff", Jul. 7, 1934; Aus dem Anorganisch-chemischen Laboratorium der Technischen Hochschule Berlin) *Machine Translation*, pp. 149-151.

Chengzhou Zhu, et al; "Reducing Sugar: New Functional Molecules for the Green Synthesis of Graphene Nanosheets", www.acsnano.org; vol. 4, No. 4, pp. 2429-2437; Published online Apr. 1, 2010.

Jian Gao, et al; "Environment-Friendly Method To Produce Graphene That Employs Vitamin C and Amino Acid", Chem. Mater., vol. 22, pp. 2213-2218, Published on Web Feb. 18, 2010; pub.acs.org/cm.

Jian Gao, et al; *Supporting Information Environment-Friendly Method to Produce Graphene That Employs Vitamin C and Amino Acid*, 2 pages; Chem. Mater. vol. 22, Published on Web Feb. 18, 2010.

* cited by examiner

METHOD FOR FABRICATING GRAPHENE SHEETS OR GRAPHENE PARTICLES USING SUPERCRITICAL FLUID

CROSS-REFERENCE TO RELATED APPLICATION

Pursuant to 35 U.S.C. §119(a), this application claims the benefit of earlier filing date and right of priority to Korean Application No. 10-2011-0000611, filed on Jan. 4, 2011 and No. 10-2011-0034741, filed on Apr. 14, 2011, the contents of which is incorporated by reference herein in its entirety.

BACKGROUND OF THE INVENTION

1. Field of the Invention

This specification relates to a method for fabricating graphene sheets or graphene particles, and particularly, to a graphene fabrication method using a supercritical condition.

2. Background of the Invention

Graphene is a single atomic layer of a honeycomb lattice, which is composed of carbon atoms that form hexagonal rings. Graphene is considered two-dimensional because it is one atom thick. Graphene is a rapidly rising star on various fields by virtue of excellent properties such as extremely high electrical mobility, thermal conductivity, mechanical strength, transparency quantized according to thickness, high specific surface and the like (Park et al., Nature Nanotechnology, 2010, 4, 217-224; Geim, Science, 2009, 324, 1530-1534; Allen et al., Chemical Reviews, 2010, 110, 132-145). The graphene may act as next generation energy storage materials, silicon substitutes, supercapacitors, lightweight components, electromagnetic shielding materials, sensors, displays and the like, and thus be applied to various fields of vehicle, energy, marine, aerospace, architecture, electronic product, medicine, military science and communication (Stankovich et al., Nature, 2006, 442, 282-286; Stoller et al., Nano Letters, 2008, 8, 3498-3502; Dikin et al., Nature, 2006, 448, 457-460; Ramanathan et al., Nature Nanotechnology, 2008, 3, 327-331; Blake et al., Nano Letters, 2008, 8, 1704-1708; Bunch et al., Science, 2007, 315, 490-493).

In order to apply the graphene to more various fields, a graphene fabricating method, which allows a mass production, an economical efficiency and a fast and simplified fabrication, need to be developed. Graphene fabrication methods, which have been introduced so far, include a chemical vapor deposition, a method for peeling a graphene single layer off from a graphite multi-layer sheet using an adhesive tape ("Scotch-tape" or "Peel off" method), a method for cutting carbon nanotubes, a thermal exfoliation for graphite, a chemical reduction and the like. Among others, the chemical reduction has many advantages, as compared with other graphene fabrication methods, of allowing a mass production, a relatively high economical efficiency and an introduction of various chemical functional groups (Kaner et al., Science, 2008, 320, 1170-1171). In addition, a graphene sheet, which is easily dispersible in an appropriate medium, is produced to be applicable to various fields, such as paper structures, thin film coating on various substrates, polymer nanocomposites and the like.

Upon employing the chemical reduction for graphene, graphite is oxidized (oxygenated) using an oxidizer to produce graphene oxide flake. The graphene oxide flake is a single atomic layer. Also, the graphene oxide flake has hydrophilicity due to a functional group, such as epoxy group (—O—), carboxyl group (—COOH), carbonyl group (—C═O), hydroxyl group (—OH) and the like, which are generated upon oxygenation, thereby being highly dispersible in polar solvents such as water or alcohols. However, the graphene oxide does not have the graphene-exclusive hexagonal structure due to the oxygenated functional group, and thereby rarely has an electrical conductivity. Consequently, the graphene oxide needs to be converted into graphene having high electrical conductivity through an appropriate deoxygenation or reduction.

Various chemical methods have been attempted to fabricate graphene through the deoxygenation or reduction with respect to the graphene oxide. Among others, a method using a strong reductant, such as hydrazine ($NH_2NH_2$), dimethylhydrazine ($CH_3NHNHCH_3$), hydroquinone ($HOC_6H_4OH$), sodium borohydride ($NaBH_4$), hydrogen sulfide ($H_2S$) and the like, has been introduced (Tung et al., Nature Nanotechnology, 2008, 4, 25-29; Lomeda et al., Journal of American Chemical Society, 2008, 130, 16201-16206; Stankovich et al., Nature, 2006, 442, 282-286; Wang et al., Journal of Physical Chemistry C, 2008, 112, 8192-8195; Si et al., Nano Letters, 2008, 8, 1679-1682; Hofman et al., Kolloid-Zeitschrift, 1934, 68, 149-151).

The use of strong reductant allows a relatively effective removal of oxygen, which results in fabrication of graphene having a relatively high electrical conductivity. However, most of strong reductants are very highly corrosive and explosive, very harmful to human bodies and causes environmental pollution. Accordingly, when fabricating the graphene in large quantity, a fabricating cost increases. When using hydrazine, which is well known as the most effective reductant for the deoxygenation of graphene oxide, the thusly-generated graphene contains nitrogen, which makes the graphene have an electrical conductivity much lower than that of graphite. Recognizing such problem, a method using a relatively weak reductant, such as sugar, vitamin C and the like, has been proposed (Zhu et al, ACS Nano, 2010, 4, 2429-2437; Gao et al, Chemistry of Materials, 2010, 22, 2213-2218). The use of weak reductant is eco-friendly and harmless to human bodies but oxygen is not effectively removed from the graphene oxide due to low reducing power of the reductant. Furthermore, when using the weak reductants, a graphite-exclusive hexagonal structure is not exhibited and accordingly defective graphene is fabricated, thereby lowering quality of the graphene due to the low electrical conductivity. In addition, a relatively long reaction time of 6 to 24 hours is required for removing more oxygen from the graphene oxide dispersed in an aqueous solution using the weak reductants and a batch type reaction is employed, thereby lowering uniformity and productivity of product.

Thus, to extensively apply graphene to various fields, the deoxygenation of the graphene oxide should be carried out more effectively to fabricate graphene with high quality and also the deoxygenation should be more eco-friendly and harmless to human bodies so as to reduce an additional fabricating cost for processing by-products. Accordingly, development of a method satisfying such requirements is urgently required. Also, it is required to develop a graphene fabricating method, in which the deoxygenation of the graphene oxide is rapidly carried out.

SUMMARY OF THE INVENTION

Therefore, an aspect of the detailed description is to provide a method for fabricating graphene sheets or graphene particles by deoxygenation of graphene oxide without use of reductants, capable of fabricating graphene sheets or graphene particles, which are eco-friendly, excellent in productivity, allowed for mass production, and have uniform high qualities and high electrical conductivities, and a method for fabricating a graphene film composed of the graphene sheets or graphene particles.

Another aspect of this detailed description is to provide graphene sheets or graphene particles fabricated by the method for fabricating the graphene from the graphene oxide using supercritical fluid and a graphene film.

To achieve these and other advantages and in accordance with the purpose of this specification, as embodied and broadly described herein, a method for fabricating graphene sheets or graphene particles may include (a) dispersing graphene oxide in an alcohol solution to prepare a graphene oxide dispersion solution, (b) reducing the graphene oxide dispersion solution under a supercritical condition to prepare graphene sheets or graphene particles, each of which is as a cluster of the graphene sheets, and (c) separating the graphene sheets or graphene particles, followed by washing and drying, and a method for fabricating a graphene film may be configured to fabricate a graphene film in form of a thin film using the graphene sheets or graphene particles fabricated according to the method.

In accordance with the aspects, it is possible to fabricate graphene sheets or graphene particles with high electrical conductivities and high qualities by deoxygenation of graphene oxide under supercritical fluid conditions, and a graphene film composed of the graphene sheets or graphene particles. The method for fabricating the graphene sheets or graphene particles is eco-friendly, which allows overcoming of an increase in fabricating costs due to high corrosiveness, high explosiveness, toxicity to human bodies, environmental pollution and the like, which are caused when using strong reductants, among existing methods of fabricating graphene from graphene oxide, resulting in reduction of equipment cost and running cost. Also, under the supercritical fluid conditions, the deoxygenation of the graphene oxide can be carried out very effectively, so as to overcome the problem that graphene with a high amount of oxygenated functional group and with a low electrical conductivity is fabricated due to the use of weak reductant.

The deoxygenation of the graphene oxide within the supercritical fluid can be carried out very fast, which allows reduction of a graphene production time, facilitates graphene production, and ensures uniform quality, mass production and economic efficiency.

In order to overcome the drawback of fabricating the graphene through the deoxygenation using the reductants performed in the related art, when graphene is fabricated by deoxygenation without use of reductants under supercritical fluid conditions, oxygen can be effectively removed within a very short time of few minutes—few hours. Consequently, graphene sheets or graphene particles with high qualities and high electrical conductivities can be fabricated. Also, since any reductant is not used, the graphene sheets or graphene particles can be fabricated by an eco-friendly method. In addition, the deoxygenation of graphene is carried out very fast under the supercritical fluid conditions even without using reductants, so graphene sheets or graphene particles with high qualities can be fabricated by a continuous process.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Figure 1:
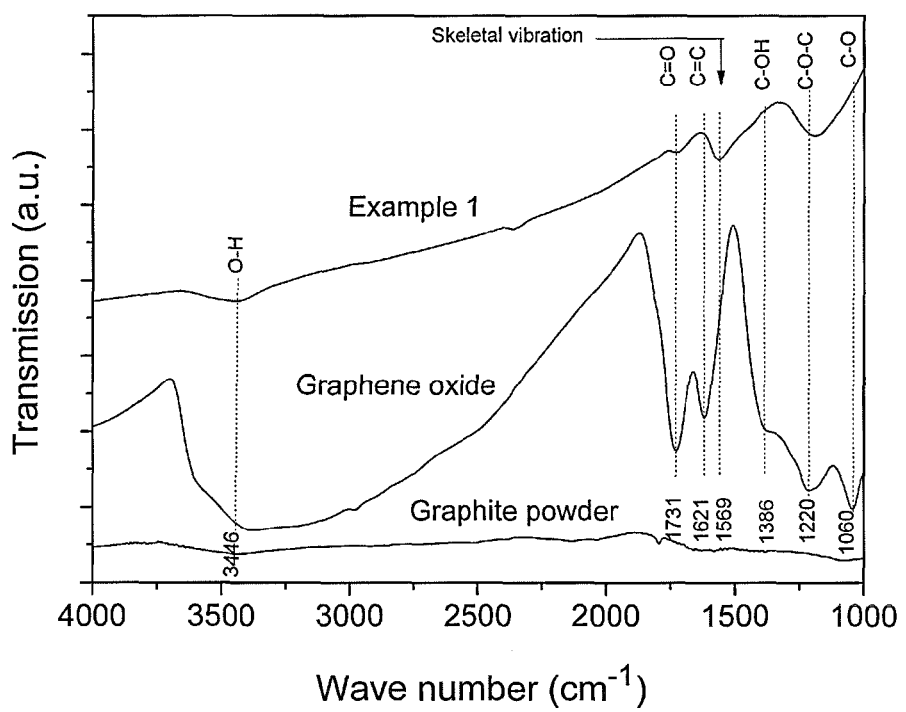
FIG. 1 is a graph showing FT-IR measurement results of graphene fabricated within a supercritical methanol through a batch-type supercritical fluid process of Example 1.

Description will now be given in detail of the exemplary embodiments, with reference to the accompanying drawings.

A method for fabricating graphene sheets or graphene particles according to this specification may include (a) dispersing graphene oxide in an alcohol solvent to prepare a graphene oxide dispersion solution, (b) reducing the graphene oxide dispersion solution under a supercritical condition to prepare graphene sheets or graphene particles, each of which is as a cluster of the graphene sheets, and (c) separating the graphene sheets or graphene particles, followed by washing and drying. The graphene sheet indicates a monolayer of graphite structure separated from graphite. When the graphene sheets are clustered, the graphene particle is prepared.

First, the step (a) is to disperse the graphene oxide in alcohol. The graphene oxide may be fabricated by processing graphite particles using a strong acid, such as strong sulfuric acid or nitric acid, and an oxidizer, such as potassium permanganate ($KMnO_4$) or the like. The graphene oxide is a single atomic layer in form of a flake, and has hydrophilicity due to a functional group, such as epoxy group (—O—), carboxyl group (—COOH), carbonyl group (—C=O), hydroxyl group (—OH) or the like, thereby being highly dispersible in water. To disperse the prepared graphene oxide in alcohol, a typical dispersion method such as supersonic waves may be employed.

Prior to the step (a), the method may further include (a') processing the graphite using the strong acid and the oxidizer to prepare the graphene oxide.

The graphene oxide may be a flake of a single atomic layer. The graphene oxide may include at least one functional group selected from a group consisting of epoxy group, carboxyl group, carbonyl group and hydroxyl group, thus to be highly dispersible in water or an alcohol solvent.

The alcohol solvent may be a solvent that one or more hydroxyl groups are bonded to a backbone having 1 to 10 carbons. More preferably, alcohol that one or more hydroxyl groups are bonded to a backbone having 1 to 7 carbons may be used, but the present disclosure may not be limited to the type of alcohol.

The concentration of the graphene oxide within the graphene oxide dispersion solution may be in the range of 0.1 g/l to 1000 g/l, and more preferably, in the range of 1 g/l to 500 g/l. If the concentration of the graphene oxide within the graphene oxide dispersion solution is lower than 0.1 g/l, the graphene sheets or graphene particles prepared within a unit time are of small quantity due to the dilute concentration, thereby lowering economical efficiency. If the amount of the graphene oxide exceeds 1000 g/l, an effective deoxygenation of the graphene oxide cannot be expected due to the high concentration and uniformity can be deteriorated, thereby lowering product quality.

The step (b) may be carried out in a batch reactor or a continuous reactor. When the continuous reactor is used, uniform qualities can be maintained upon mass production.

The step (b) may be carried out at 100-600° C. and 20-600 bar. The reaction temperature of 300-500° C. and the reaction pressure of 100-500 bar may be preferable. When the reaction temperature is lower than 100° C. or when the reaction pressure is lower than 20 bar, reducing power of the supercritical alcohol may be lowered, which interferes with an effective deoxygenation of the graphene oxide, thereby producing graphene with a low electrical conductivity. When the reaction temperature exceeds 600° C. or when the reaction pressure exceeds 600 bar, a cost-related problem for maintaining high temperature and high pressure may be caused, thereby lowering the economical efficiency.

Although any specific limit is not given to a retention time within the reactor, 10 seconds to 6 hours may be preferable, and 1 minute to 4 hours may be more preferable. When the retention time within the reactor is shorter than 10 seconds, the short retention time may interfere with the effective deoxygenation of the graphene oxide within the supercritical alcohol, which may cause a problem that bad graphene in quality with a low electrical conductivity is fabricated. Furthermore, when exceeding 6 hours, productivity may be lowered and economical efficiency may be deteriorated due to increase in the retention time under the high temperature and high pressure conditions.

The alcohol solvent may be at least one selected from a group consisting of methanol (critical temperature=239° C.; critical pressure=81 bar), ethanol (critical temperature=241° C.; critical pressure=63 bar), propanol (critical temperature=264° C.; critical pressure=52 bar), isopropyl alcohol (critical temperature=307° C.; critical pressure=41 bar), butanol (critical temperature=289° C.; critical pressure=45 bar), iso-butanol (critical temperature=275° C.; critical pressure=45 bar), 2-butanol (critical temperature=263° C.; critical pressure=42 bar), tert-butanol (critical temperature=233° C.; critical pressure=40 bar), n-pentanol (critical temperature=307° C.; critical pressure=39 bar), isopentyl alcohol (critical temperature=306° C.; critical pressure=39 bar), 2-methyl-1-butanol (critical temperature=302° C.; critical pressure=39 bar), neopentyl alcohol (critical temperature=276° C.; critical pressure=40 bar), dimethyl carbinol (critical temperature=286° C.; critical pressure=39 bar), methyl propyl carbinol (critical temperature=287° C.; critical pressure=37 bar), methyl isopropyl carbinol (critical temperature=283° C.; critical pressure=39 bar), dimethyl ethyl carbinol (critical temperature=271° C.; critical pressure=37 bar), 1-hexanol (critical temperature=337° C.; critical pressure=34 bar), 2-hexanol (critical temperature=310° C.; critical pressure=33 bar), 3-hexanol (critical temperature=309° C.; critical pressure=34 bar), 2-methyl-1-pentanol (critical temperature=331° C.; critical pressure=35 bar), 3-methyl-1-pentanol (critical temperature=387° C.; critical pressure=30 bar), 4-methyl-1-pentanol (critical temperature=330° C.; critical pressure=30 bar), 2-methyl-2-pentanol (critical temperature=286° C.; critical pressure=36 bar), 3-methyl-2-pentanol (critical temperature=333° C.; critical pressure=36 bar), 4-methyl-2-pentanol (critical temperature=301° C.; critical pressure=35 bar), 2-methyl-3-pentanol (critical temperature=303° C.; critical pressure=35 bar), 3-methyl-3-pentanol (critical temperature=302° C.; critical pressure=35 bar), 2,2-dimethyl-1-butanol (critical temperature=301° C.; critical pressure=35 bar), 2,3-dimethyl-1-butanol (critical temperature=331° C.; critical pressure=35 bar), 2,3-dimethyl-2-butanol (critical temperature=331° C.; critical pressure=35 bar), 3,3-dimethyl-1-butanol (critical temperature=331° C.; critical pressure=35 bar), 2-ethyl-1-butanol (critical temperature=307° C.; critical pressure=34 bar), 1-heptanol (critical temperature=360° C.; critical pressure=31 bar), 2-heptanol (critical temperature=335° C.; critical pressure=30 bar), 3-heptanol (critical temperature=332° C.; critical pressure=30 bar), and 4-heptanol (critical temperature=329° C.; critical pressure=30 bar). The supercritical conditions may be critical temperature and critical pressure of the alcohol.

The step (c) is to separate the prepared graphene sheets or graphene particles from the alcohol. The step (c) may be carried out to separate the graphene sheets or graphene particles prepared through the reduction executed at the step (b) and dry the separated graphene sheets or graphene particles. The separation may be executed by centrifugation or filtering. Any mechanism may be applicable if it is able to separate the particles from an unreacted precursor solution.

After the step (c), the method may further include (c') dispersing the graphene sheets or graphene particles in a solvent, followed by centrifugation, and purifying the centrifuged graphene sheets or graphene particles. Here, the solvent may be alcohol, acetone, tetrahydrofuran and the like, but any solvent may be applicable if the prepared graphene sheets or graphene particles are dispersible therein.

A method for fabricating a graphene film is to fabricate a graphene film in form of a thin film using the graphene sheets or graphene particles prepared according to the above method, and the graphene film may be fabricated by dispersing graphene sheets or graphene particles in a solvent to prepare a graphene particle dispersion solution, performing a membrane separation for the graphene particle dispersion solution using a filter, and separating a graphene film formed on the filter from the filter.

EXAMPLE AND COMPARATIVE EXAMPLE

Hereinafter, description will be given in more detail with reference to examples and comparative examples. Here, those examples are merely illustrative without limit to the present disclosure. Hereinafter, the term 'graphene' may be interchangeably used with graphene sheet or graphene particle.

Graphene Characteristic Analysis

Morphology of graphene prepared according to the fabrication method was analyzed by using a transmission electron microscopy (TEM) produced by EFI Co., Ltd, and the level of deoxygenation of graphene oxide was analyzed by using a Fourier transform infrared spectroscopy (FT-IR) produced by Thermo Electron Co., Ltd, an X-ray photoelectron spectroscopy (XPS) from Physical Electronics, and an Elemental Analysis (EA) from Thermo Schentifics. A thermal property of graphene was measured by use of a Thermogravimetric Analysis (TGA) made by DuPont. Also, an electrical conductivity of graphene was measured by using a four-point probe from Jandel Co., Ltd, after preparing a free-standing graphene film. The free-standing graphene film was prepared by dispersing graphene, which was reduced by a supercritical alcohol, in methylene chloride ($CH_2Cl_2$), forming a film on a filter using a porous alumina filter, manufactured by Millipore Co., Ltd, through a vacuum filtering, and drying the film in the air to separate the film from the filter.

Example 1

Fabrication of Graphene using Batch-Type Supercritical Fluid Process (1)

Figure 2:
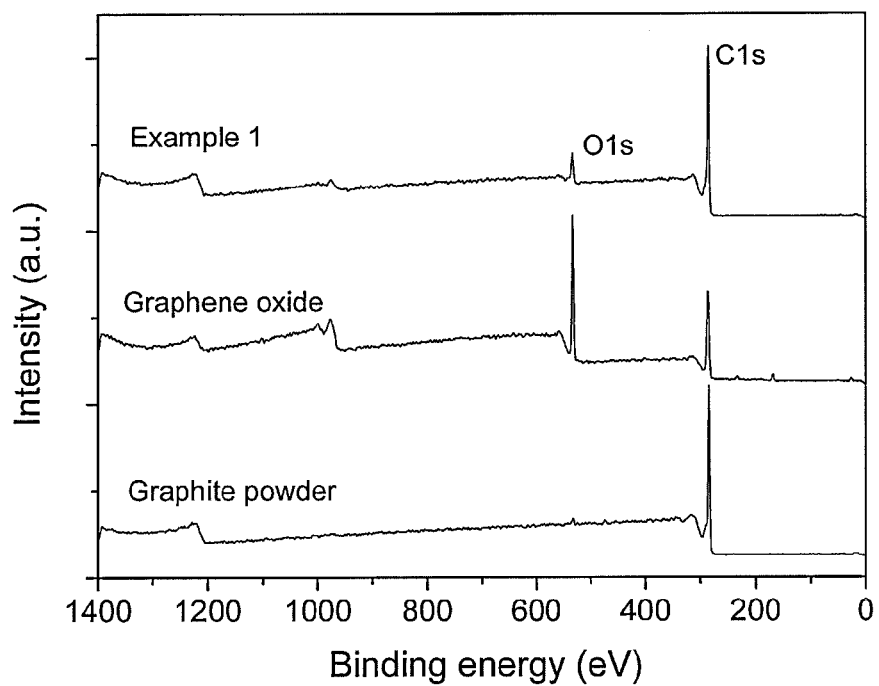
FIG. 2 is a graph showing XPS measurement results of the graphene fabricated within the supercritical methanol through the batch-type supercritical fluid process of Example 1.
Figure 3:
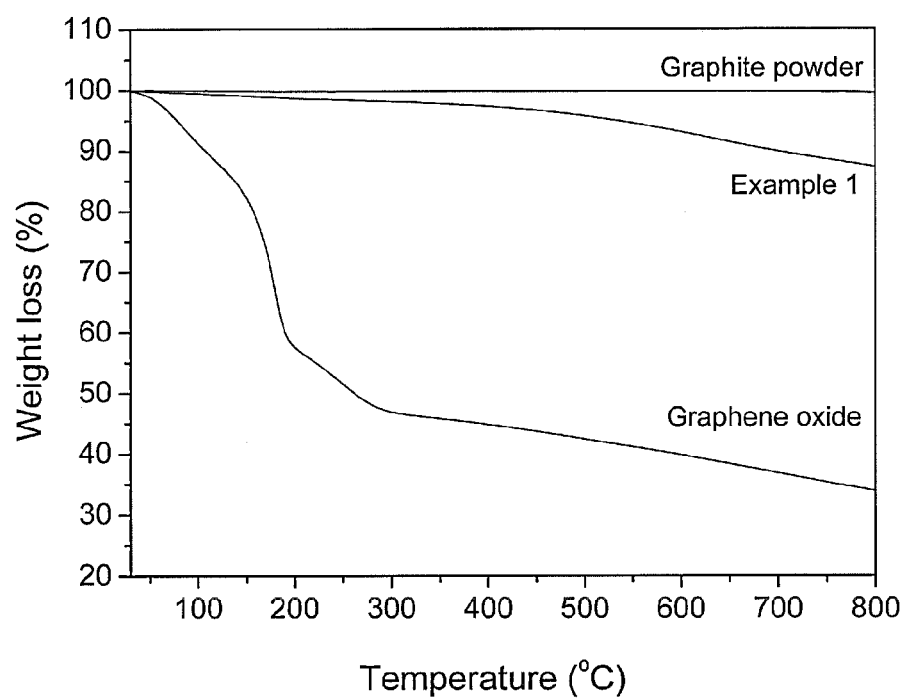
FIG. 3 is a graph showing TGA measurement results of the graphene fabricated within the supercritical methanol through the batch-type supercritical fluid process of Example 1.
Figure 4:
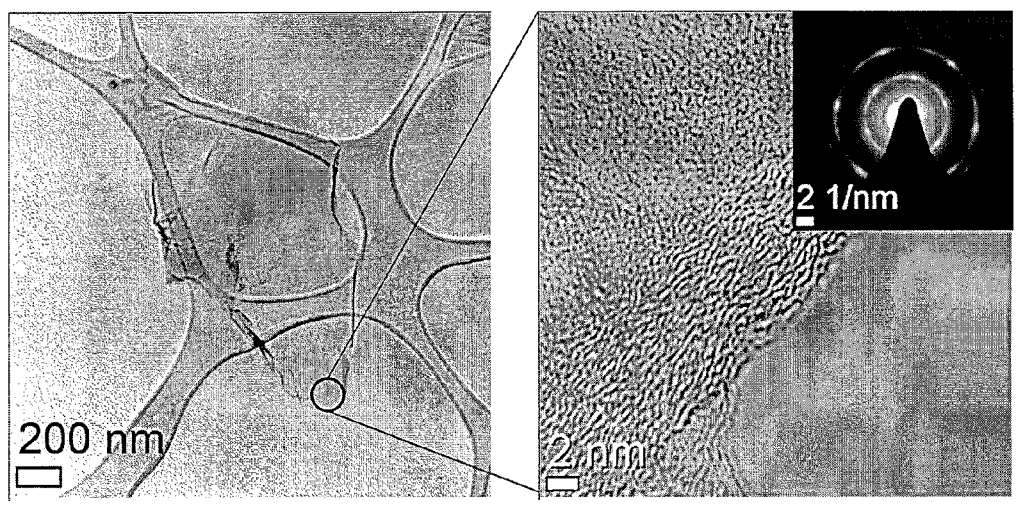
FIG. 4 is a TEM image of the graphene fabricated within the supercritical methanol through the batch-type supercritical fluid process of Example 1.

Graphene oxide was fabricated by a modified Hummers method, in which graphite powders were processed using strong sulfuric acid, $K_2S_2O_8$ and $P_2O_5$ followed by processing with $KMnO_4$ and $H_2O_2$. 1 g of graphene oxide was dispersed in 50 ml of methanol to adjust a concentration of the graphene oxide to 20 g/l. 3.5 ml, of graphene oxide dispersed methanol solution was introduced in 10 ml of a high temperature and high pressure reactor, which was made of alloy (Hastelloy C276). The reactor was introduced in a salt bath maintained at temperature of 400° C. and made to have pressure reached 300 bar. Under this conditions, deoxygenation was carried out for 2 hours. The thusly-generated graphene solution was cooled in 10° C. water and filtered through a filter, thereby separating and collecting the graphene. The collected graphene was dried for a day in a 60° C. vacuum oven, thereby removing methanol. FIG. 1 is a graph showing FT-IR results of the thusly-fabricated graphene, FIG. 2 shows XPS results of the graphene fabricated in Example 1, and FIG. 3 shows TGA results of the graphene fabricated in Example 1. Also, FIG. 4 is a TEM image of the graphene fabricated in Example 1

As shown in FIG. 1, it can be noticed that the oxygenation was carried out because hydroxyl group (O—H, 3446 $cm^{-1}$), carbonyl group (C═O, 1731 $cm^{-1}$), C═C group (1621 $cm^{-1}$), alcohol group (C—OH, 1386 $cm^{-1}$), epoxy group (C—O—C, 1220 $cm^{-1}$) and ether group (C—O, 1060 $cm^{-1}$) were present in the FT-IR spectrum of the graphene oxide. When deoxygenation with respect to the graphene oxide was carried out using supercritical methanol for reduction, it was exhibited that transmissions associated with the oxygenated functional groups, which carbon was bonded to oxygen, such as hydroxyl group, carbonyl group, alcohol group, epoxy group, ether group and the like were remarkably reduced due to. On the contrary, it was exhibited, in the graphene reduced in the supercritical methanol, that transmission (1569 $cm^{-1}$) corresponding to a skeletal vibration peculiar to graphite was increased. Accordingly, it was understood that the supercritical methanol was very effective for the deoxygenation of the graphene oxide.

As shown in FIG. 2, it can be exhibited that little oxygen is present in the XPS spectrum of the graphite powders whereas the graphene oxide contains much oxygen in view of a remarkable increase in an oxygen peak. On the contrary, it can be understood that the oxygen peak is greatly decreased when deoxygenating the graphene oxide using the supercritical methanol for reduction in Example 1. Table 1 shows results obtained by quantifying atomic percent of carbon and oxygen and calculating carbon to oxygen (C/O) ratios. The graphite powders exhibited very high C/O ratio of 97.47, from which it was recognized that oxygen was rarely present in the graphite powders. The graphene oxide exhibited C/O ratio of 1.95, from which it was recognized that much oxygen was present within the graphene oxide. Also, the graphene, which was obtained by reducing graphene oxide by the deoxygenation within supercritical methanol, exhibited C/O ratio of 11.89 measured by XPS. Consequently, it was confirmed that oxygen was much removed from the graphene. Quantities of carbon, oxygen and hydrogen were measured by using EA and C/O ratios were measured. The thusly-obtained results were shown in Table 1. The C/O rate measured by EA exhibited very similar tendency to C/O ratio measured by XPS.

FIG. 3 is the TGA graph of the graphene fabricated in Example 1. Since the graphite powders contain little oxygen, the weight of the graphite powders was not reduced even when heating at 800° C. On the contrary, the graphene oxide showed 66% weight loss of its original weight upon increasing temperature up to 800° C. This results from the fact that the oxygen functional groups present in the graphene oxide are gasified into form of CO or $CO_2$. For the graphene fabricated in Example 1, the graphene exhibited 13% weight loss when increasing temperature up to 800° C., from which it can be understood that the deoxygenation has been effectively carried out.

FIG. 4 shows an HR-TEM image of the graphene fabricated in Example 1 and electron scattering results measured by a selective area diffraction pattern. The image shows that the graphene has a single-layered structure or a structure of a multi-layered nanosheet that 2 or 3 graphene sheets are laminated. Therefore, it can be understood that the graphene reduced by the supercritical methanol has a flaked structure. The electron scattering results show that the electron scattered from the (1100) plane of the graphene was exhibited at the first ring, and the electron scattered from (1120) plane of the graphene was exhibited at the second ring. Also, the patterns scattered from (0001) plane of the graphene were exhibited as very bright points at the first and second rings in a hexagonal structure. Hence, it can be understood that the crystalinity of the graphene fabricated by the batch process within supercritical methanol is excellent.

The graphene oxide was deoxygenated using the supercritical methanol for reduction in Example 1 and a graphene film was prepared from the reduced graphene nanosheets. The electrical conductivity of the graphene film was measured by the four-point probe method. Accordingly, it was exhibited that the electrical conductivity of the graphene film was very high of 3,247 S/m. Hence, when reducing the graphene oxide using the supercritical methanol, the deoxygenation of the graphene oxide was very effectively carried out so as to fabricate the graphene nanosheets. Thus, it is determined that when fabricating the graphene nanosheets as a free-standing film, the graphene nanosheets were adhered closely together by van der Waals attraction and accordingly the film has a high electrical conductivity.

Example 2

Fabrication of Graphene using Batch-Type Supercritical Fluid Process (2)

Graphene was fabricated according to the same method as employed in Example 1 excluding that the reaction time was 1 hour other than 2 hours. The fabricated graphene was analyzed through XPS and EA according to the same method as employed in Example 1 and the analysis results were shown in Table 1 as follows.

Example 3

Fabrication of Graphene using Batch-Type Supercritical Fluid Process (3)

Graphene was fabricated according to the same method as employed in Example 1 excluding that the reaction time was 30 minutes other than 2 hours. The fabricated graphene was analyzed through XPS and EA according to the same method as employed in Example 1 and the analysis results were shown in Table 1 as follows.

Example 4

Fabrication of Graphene using Batch-Type Supercritical Fluid Process (4)

Graphene was fabricated according to the same method as employed in Example 1 excluding that the reaction time was 15 minutes other than 2 hours. The fabricated graphene was analyzed through XPS according to the same method as employed in Example 1 and the analysis results were shown in Table 1 as follows.

Example 5

Fabrication of Graphene using Batch-Type Supercritical Fluid Process (5)

Graphene was fabricated according to the same method as employed in Example 1 excluding that the reaction time was 5 minutes other than 2 hours. The fabricated graphene was analyzed through XPS and EA according to the same method as employed in Example 1 and the analysis results were shown in Table 1 as follows.

Example 6

Fabrication of Graphene using Batch-Type Supercritical Fluid Process (6)

Graphene was fabricated according to the same method as employed in Example 1 excluding the use of the graphene oxide in 40 g/l concentration other than 20 g/l concentration. The fabricated graphene was analyzed through XPS and EA according to the same method as employed in Example 1 and the analysis results were shown in Table 1 as follows.

Example 7

Fabrication of Graphene using Batch-Type Supercritical Fluid Process (7)

Graphene was fabricated according to the same method as employed in Example 1 excluding the use of the graphene oxide in 286 g/l concentration other than 20 g/l concentration. The fabricated graphene was analyzed through XPS and EA according to the same method as employed in Example 1 and the analysis results were shown in Table 1 as follows.

Example 8

Fabrication of Graphene using Batch-Type Supercritical Fluid Process (8)

Graphene was fabricated according to the same method as employed in Example 1 excluding the use of ethanol other than methanol, as a reaction solvent. The fabricated graphene was analyzed through XPS and EA according to the same method as employed in Example 1 and the analysis results were shown in Table 1 as follows.

Example 9

Fabrication of Graphene using Batch-Type Supercritical Fluid Process (9)

Graphene was fabricated according to the same method as employed in Example 1 excluding the use of propanol other than methanol as a reaction solvent. The fabricated graphene was analyzed through XPS and EA according to the same method as employed in Example 1 and the analysis results were shown in Table 1 as follows.

Example 10

Fabrication of Graphene using Batch-Type Supercritical Fluid Process (10)

Graphene was fabricated according to the same method as employed in Example 1 excluding the use of butanol other than methanol as a reaction solvent. The fabricated graphene was analyzed through XPS and EA according to the same method as employed in Example 1 and the analysis results were shown in Table 1 as follows.

TABLE 1

| Examples | Solvents | Graphene oxide concentration (g/l) | Reaction time | C/O ratio by EA | C/O ratio by XPS |
|---|---|---|---|---|---|
| Example 1 | Supercritical methanol | 20 | 2 h | 11.10 | 11.89 |
| Example 2 | Supercritical methanol | 20 | 1 h | 10.18 | 10.03 |
| Example 3 | Supercritical methanol | 20 | 30 min | 9.25 | 9.17 |
| Example 4 | Supercritical methanol | 20 | 15 min | 8.18 | 8.78 |
| Example 5 | Supercritical methanol | 20 | 5 min | 6.01 | 6.25 |
| Example 6 | Supercritical methanol | 40 | 2 h | 13.52 | 13.79 |
| Example 7 | Supercritical methanol | 286 | 2 h | 12.58 | 13.08 |
| Example 8 | Supercritical ethanol | 20 | 2 h | 12.04 | 11.56 |
| Example 9 | Supercritical propanol | 20 | 2 h | 10.21 | 10.15 |
| Example 10 | Supercritical butanol | 20 | 2 h | 9.56 | 9.09 |
| Graphene oxide | — | — | — | 2.31 | 1.95 |
| Graphite | — | — | — | >98 | 97.47 |

As shown in Table 1, when the reaction time was decreased from 2 hours to 5 minutes in Examples 1 and 5, C/O ratio measured by XPS was reduced from 11.89 to 6.25. Accordingly, it was observed that the decrease in reaction time leaded to the reduction of the deoxygenated level. However, even when the reaction time was very short of 5 minutes in Example 5, the C/O ratio was exhibited as 6.25. It can thus be understood that the deoxygenation of the graphene oxide within the supercritical methanol has been effectively executed. Also, in Examples 1 and 5, when the concentration of the graphene oxide dispersed in the supercritical methanol increased from 20 g/l to 40 g/l, the C/O ratio slightly increased from 11.89 to 13.79, which exhibited the execution of the effective deoxygenation. Furthermore, in Examples 5 and 6, in spite of increasing the concentration of the graphene oxide dispersed in the supercritical methanol from 40 g/l to 286 g/l, the C/O ratio rarely changed. Consequently, it can be understood that the effective deoxygenation has been carried out irrespective of use of the graphene oxide in the extremely high concentration. Even when using the supercritical ethanol, the supercritical propanol and the supercritical butanol were used instead of the supercritical methanol as the supercritical alcohol in Examples 1 and 7 to 9, the C/O ratios of the fabricated graphene were 11.89~9.09, which were much higher than 1.95 as the C/O ratio of the graphene oxide prior to reduction. Hence, it can be noticed that deoxygenation was sufficiently carried out in each supercritical alcohol solvent. Therefore, it can be recognized that alcohols in their supercritical condition has reducing power so as to be very effective for the deoxygenation of the graphene oxide.

Example 11

Preparation of Graphene using Continuous Supercritical Fluid Process

Figure 5:
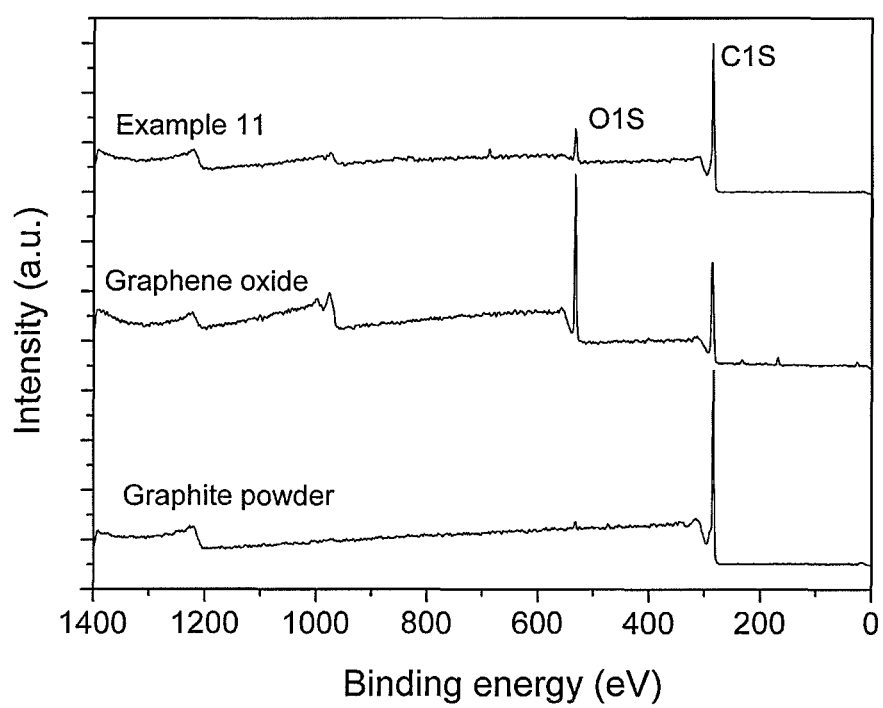
FIG. 5 is a graph showing XPS measurement results of graphene fabricated within a supercritical methanol through a continuous supercritical fluid process of Example 10.

Methanol was introduced in a 1000 ml glass container, in which 10 g of graphene oxide was then dispersed to adjust the dispersed graphene concentration to 20 g/l. The graphene oxide-dispersed methanol solution was pumped at a rate of 3 g/min at room temperature using a high-pressure pump, and pressurized at 250 bar. Methanol was introduced in another 1 l plastic container, pumped at a rate of 9 g/min using another high-pressure pump, pressurized at 250 bar, and then transferred into a preheater. The pressurized precursor mixture and the methanol were conveyed into a high-temperature and high-pressure reactor, which was maintained at a temperature of 400° C., to react for 15 minutes. Then, the thusly-generated graphene particle solution was cooled using a cooler. The graphene particles were separated and collected from the solution using a metal filter. After the separated graphene was dried for a day in 60° C. vacuum oven to remove methanol, the same analysis as that in Example 1 was executed. FIG. 5 shows XPS results of the graphene fabricated by the continuous process using the supercritical methanol of Example 11. As shown in FIG. 5, it is exhibited that the oxygen peak has remarkably been reduced when compared to the graphene oxide. Also, the C/O ratio measured by XPS is exhibited as 8.43. Accordingly, it can be understood that effective deoxygenation has been carried out in the graphene oxide even when employing the continuous process, similar to employing the batch-type process.

Figure 6:
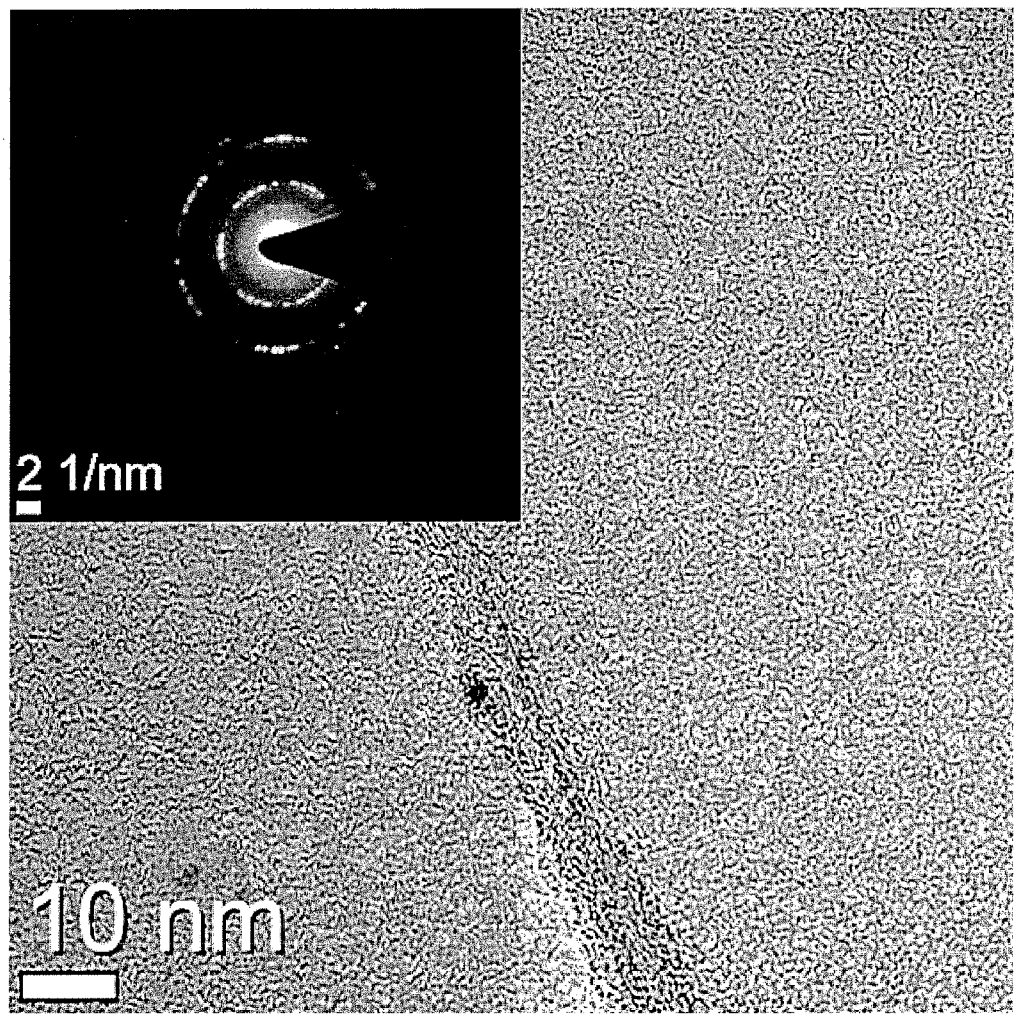
FIG. 6 is a TEM image of the graphene fabricated within the supercritical methanol through the continuous supercritical fluid process of Example 10.

FIG. 6 shows HR-TEM results of the graphene fabricated by deoxygenation from the graphene oxide through the continuous process using the supercritical methanol and electron scattering results measured by a selective area diffraction pattern. Similar to employing the batch-type process, most of graphene sheets aggregated to form thick graphene flakes. The electron scattering results shows that the electron scattered from the (1100) plane of the graphene was exhibited at the first ring, and the electron scattered from (1120) plane of the graphene was exhibited at the second ring. The scattered patterns from (0001) plane of the graphene were exhibited as very bright points at the first and second rings in a hexagonal structure. Hence, it can be understood that the crystalinity of the graphene fabricated by the continuous supercritical methanol process is excellent. The graphene fabricated by deoxygenation from the graphene oxide through the continuous supercritical methanol process has a very high electrical conductivity of 1,523 S/m, from which it can be noticed that highly reduced graphene was fabricated. Consequently, it was exhibited that graphene nanosheets with a high electrical conductivity could be fabricated even when employing the continuous process, similar to employing the batch-type process.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A method for fabricating graphene sheets or graphene particles comprising:
   (a) dispersing graphene oxide in an alcohol solution to prepare a graphene oxide dispersion solution;
   (b) reducing the graphene oxide dispersion solution under a supercritical condition to prepare graphene sheets or graphene particles, each of which is as a cluster of the graphene sheets; and
   (c) separating the graphene sheets or graphene particles, followed by washing and drying.

2. The method of claim 1, further comprising prior to step (a):
   (a') processing graphite using a strong acid and an oxidizer to prepare the graphene oxide.

3. The method of claim 1, wherein the graphene oxide is a flake of a single atomic layer.

4. The method of claim 1, wherein the graphene oxide includes at least one functional group selected from a group consisting of epoxy group, carboxyl group, carbonyl group and hydroxyl group, thus to be highly dispersible in an alcohol solvent.

5. The method of claim 1, wherein the alcohol solvent is a solvent that one or more hydroxyl groups are bonded to a backbone having 1 to 10 carbons.

6. The method of claim 1, wherein the concentration of the graphene oxide within the graphene oxide dispersion solution is in the range of 0.1 g/l to 1000 g/l.

7. The method of claim 1, wherein step (b) is carried out in a batch-type reactor or a continuous reactor.

8. The method of claim 1, wherein step (b) is carried out at temperature of 100~600° C. and pressure of 20~600 bar.

9. The method of claim 1, wherein the alcohol solvent is at least one selected from a group consisting of methanol (critical temperature=239° C.; critical pressure=81 bar), ethanol (critical temperature=241° C.; critical pressure=63 bar), propanol (critical temperature=264° C.; critical pressure=52 bar), isopropyl alcohol (critical temperature=307° C.; critical pressure=41 bar), butanol (critical temperature=289° C.; critical pressure=45 bar), iso-butanol (critical temperature=275° C.; critical pressure=45 bar), 2-butanol (critical temperature=263° C.; critical pressure=42 bar), tert-butanol (critical temperature=233° C.; critical pressure=40 bar), n-pentanol (critical temperature=307° C.; critical pressure=39 bar), isopentyl alcohol (critical temperature=306° C.; critical pressure=39 bar), 2-methyl-1-butanol (critical temperature=302° C.; critical pressure=39 bar), neopentyl alcohol (critical temperature=276° C.; critical pressure=40 bar), dimethyl carbinol (critical temperature=286° C.; critical pressure=39 bar), methyl propyl carbinol (critical temperature=287° C.; critical pressure=37 bar), methyl isopropyl carbinol (critical temperature=283° C.; critical pressure=39 bar), dimethyl ethyl carbinol (critical temperature=271° C.; critical pressure=37 bar), 1-hexanol (critical temperature=337° C.; critical pressure=34 bar), 2-hexanol (critical temperature=310° C.; critical pressure=33 bar), 3-hexanol (critical temperature=309° C.; critical pressure=34 bar), 2-methyl-1-pentanol (critical temperature=331° C.; critical pressure=35 bar), 3-methyl-1-pentanol (critical temperature=387° C.; critical pressure=30 bar), 4-methyl-1-pentanol (critical temperature=330° C.; critical pressure=30 bar), 2-methyl-2-pentanol (critical temperature=286° C.; critical pressure=36 bar), 3-methyl-2-pentanol (critical temperature=333° C.; critical pressure=36 bar), 4-methyl-2-pentanol (critical temperature=301° C.; critical pressure=35 bar), 2-methyl-3-pentanol (critical temperature=303° C.; critical pressure=35 bar), 3-methyl-3-pentanol (critical temperature=302° C.; critical pressure=35 bar), 2,2-dimethyl-1-butanol (critical temperature=301° C.; critical pressure=35 bar), 2,3-dimethyl-1-butanol (critical temperature=331° C.; critical pressure=35 bar), 2,3-dimethyl-2-butanol (critical temperature=331° C.; critical pressure=35 bar), 3,3-dimethyl-1-butanol (critical temperature=331° C.; critical pressure=35 bar), 2-ethyl-1-butanol (critical temperature=307° C.; critical pressure=34 bar), 1-heptanol (critical temperature=360° C.; critical pressure=31 bar), 2-heptanol (critical temperature=335° C.; critical pressure=30 bar), 3-heptanol (critical temperature=332° C.; critical pressure=30 bar), and 4-heptanol (critical temperature=329° C.; critical pressure=30 bar), wherein the supercritical conditions are critical temperature and critical pressure of the alcohol.

10. The method of claim 1, further comprising after step (c):
(c') dispersing the graphene sheets or graphene particles in a solvent, followed by centrifugation, and purifying the centrifuged graphene sheets or graphene particles.

11. A method for fabricating graphene comprising:
dispersing graphene oxide into an alcohol;
heating and pressuring the graphene oxide alcohol dispersion at or above supercritical fluid conditions of the alcohol to reduce the graphene oxide into graphene; and
separating the graphene away from the alcohol.

12. The method of claim 11, further comprising oxidizing graphite into graphene oxide.

13. The method of claim 12, wherein oxidizing graphite comprises processing the graphite with sulfuric acid, potassium persulfate, and phosphorous pentoxide followed by processing with potassium permanganate and hydrogen peroxide.

14. The method of claim 11, wherein the alcohol comprises at least one selected from a group consisting of methanol, ethanol, propanol, isopropyl alcohol, butanol, iso-butanol, 2-butanol, tert-butanol, n-pentanol, isopentyl alcohol, 2-methyl-1-butanol, neopentyl alcohol, dimethyl carbinol, methyl propyl carbinol, methyl isopropyl carbinol, dimethyl ethyl carbinol, 1-hexanol, 2-hexanol, 3-hexanol, 2-methyl-1-pentanol, 3-methyl-1-pentanol, 4-methyl-1-pentanol, 2-methyl-2-pentanol, 3-methyl-2-pentanol, 4-methyl-2-pentanol, 2-methyl-3-pentanol, 3-methyl-3-pentanol, 2,2-dimethyl-1-butanol, 2,3-dimethyl-1-butanol, 2,3-dimethyl-2-butanol, 3,3-dimethyl-1-butanol, 2-ethyl-1-butanol, 1-heptanol, 2-heptanol, 3-heptanol, and 4-heptanol.

15. The method of claim 11, wherein the alcohol comprises methanol and/or ethanol.

16. The method of claim 11, wherein dispersing graphene oxide into the alcohol comprises using supersonic waves.

17. The method of claim 11, wherein the graphene oxide comprises at least one functional group selected from a group consisting of epoxy group, carboxyl group, carbonyl group and hydroxyl group.

18. The method of claim 11, wherein separating the graphene away from the alcohol comprises centrifuging and/or filtering.

19. The method of claim 11, wherein heating and pressuring is performed in a continuous supercritical fluid process.

20. The method of claim 11, wherein heating and pressuring is performed in a batch-type supercritical fluid process.

* * * * *